US011498121B2

(12) United States Patent
Konitzer et al.

(10) Patent No.: US 11,498,121 B2
(45) Date of Patent: Nov. 15, 2022

(54) MULTIPLE MATERIALS AND MICROSTRUCTURES IN CAST ALLOYS

(71) Applicant: General Electric Company, Schenectady, NY (US)

(72) Inventors: Douglas Gerard Konitzer, West Chester, OH (US); Brian David Przeslawski, Liberty Township, OH (US); Joshua Leigh Miller, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/816,447

(22) Filed: Mar. 12, 2020

(65) Prior Publication Data

US 2020/0290117 A1  Sep. 17, 2020

Related U.S. Application Data

(60) Provisional application No. 62/818,412, filed on Mar. 14, 2019.

(51) Int. Cl.
*B22D 27/04* (2006.01)
*B22D 27/20* (2006.01)
(Continued)

(52) U.S. Cl.
CPC ............. *B22D 27/04* (2013.01); *B22D 19/14* (2013.01); *B22D 27/20* (2013.01); *B22D 27/08* (2013.01); *B64C 27/32* (2013.01)

(58) Field of Classification Search
CPC ...... B22D 19/14; B22D 19/16; B22D 21/022; B22D 21/025; B22D 27/04; B22D 27/045;
(Continued)

(56) References Cited

U.S. PATENT DOCUMENTS 3,008,855 A   11/1961  Swenson
3,336,970 A    8/1967  Watts et al.
(Continued)

FOREIGN PATENT DOCUMENTS

CA      1113864 A    12/1981
CN    101073822 A    11/2007
(Continued)

OTHER PUBLICATIONS

European Search Report Corresponding to Application No. 20162857 dated Jul. 31, 2020.
U.S. Appl. No. 16/593,423, filed Oct. 4, 2019.

*Primary Examiner* — Kevin P Kerns
(74) *Attorney, Agent, or Firm* — Dority & Manning, P.A.

(57) ABSTRACT

Methods for creating a cast component, along with the resulting cast components, are provided. The method may include heating a mold having a cavity therein; supplying a first molten metal material into the cavity of the mold such that the first molten metal material is directed to a first portion of the cavity of the mold; supplying a second molten metal material into the cavity of the mold such that the second molten metal material is directed to a second portion of the cavity of the mold, wherein the first molten metal material is compositionally different than the second molten metal material; and thereafter, allowing the first molten metal material and the second molten metal material to form the cast component.

14 Claims, 4 Drawing Sheets

(51) Int. Cl.
*B22D 19/14* (2006.01)
*B22D 19/16* (2006.01)
B22D 27/08 (2006.01)
B64C 27/32 (2006.01)

(58) Field of Classification Search
CPC .......... B22D 27/08; B22D 27/20; B22C 9/22; F05D 2230/211; F05D 2300/175; F05D 2300/605; F05D 2300/606; F05D 2300/607; F05D 2300/608; F05D 2300/609
USPC ....... 164/122, 122.1, 122.2, 125, 91, 94, 95, 164/98
See application file for complete search history.

(56) References Cited

U.S. PATENT DOCUMENTS

| | | |
|---|---|---|
| 3,913,660 A | 10/1975 | Diez |
| 4,813,470 A | 3/1989 | Chiang |
| 4,832,112 A | 5/1989 | Brinegar et al. |
| 5,807,202 A | 9/1998 | Sammataro |
| 6,251,335 B1 | 6/2001 | Messing et al. |
| 6,634,413 B2 | 10/2003 | Ray et al. |
| 6,705,385 B2 | 3/2004 | Ray et al. |
| 8,015,900 B2 | 9/2011 | Gmirya |
| 8,870,538 B2 | 10/2014 | Garcia |
| 8,899,926 B2 | 12/2014 | Garcia |
| 8,927,113 B2 | 1/2015 | Anderson et al. |
| 8,956,108 B2 | 2/2015 | Eleftheriou et al. |
| 9,067,360 B2 | 6/2015 | Wehning et al. |
| 9,855,599 B2 | 1/2018 | Cue et al. |
| 10,702,958 B2 | 7/2020 | Garay et al. |
| 2004/0214682 A1 | 10/2004 | Sbabo |
| 2013/0160967 A1 | 6/2013 | Suzuki et al. |
| 2016/0129498 A1 | 5/2016 | Ji |
| 2017/0218848 A1 | 8/2017 | Alstad et al. |
| 2018/0222578 A1 | 8/2018 | Sbabo et al. |

FOREIGN PATENT DOCUMENTS

| | | |
|---|---|---|
| CN | 102990043 A | 3/2013 |
| DE | 2519154 A1 | 11/1976 |
| EP | 0042744 A1 | 12/1981 |
| EP | 0490187 A1 | 6/1992 |
| EP | 0897769 A1 | 2/1999 |
| WO | WO89/04224 A1 | 5/1989 |

MULTIPLE MATERIALS AND MICROSTRUCTURES IN CAST ALLOYS

PRIORITY INFORMATION

This present disclosure claims priority to U.S. Provisional Patent Application Ser. No. 62/818,412 filed on Mar. 14, 2019, which is incorporated by reference herein.

FIELD

This disclosure is generally related to metallic components, and methods for manufacturing those components. In some specific embodiments, the disclosure is related to cast metallic articles, often formed from nickel- or cobalt-based superalloys; and related, specialized casting methods.

BACKGROUND

A number of metals and metal alloys are employed in demanding applications, in terms of strength, oxidation resistance, and/or high temperature resistance. Examples include titanium, vanadium, molybdenum, and superalloys based on nickel, cobalt, or iron. Such superalloys are especially suitable for high-temperature applications, such as, for example, gas turbine engine components of aircraft engines and power generation equipment. Very often, these components are manufactured by casting processes, such as investment-casting. While metal casting has been practiced for thousands of years, the techniques have become quite sophisticated in modern times, due in part to the high level of integrity required for cast parts such as jet engine blades.

The integrity and overall quality of the metal component is determined in part by its crystalline structure, e.g., the grain size and orientation of the grains in the component. The desired grain structure is, in turn, often dependent on the projected operating temperature of the part. As an example in the case of gas turbine components formed from various superalloys, the turbine blades in the turbine section may be exposed to extremely hot temperatures, and may have a directionally solidified (DS) columnar grain structure, or a single crystal structure, to resist high-temperature creep failure and other degrading effects.

In contrast, engine components that are subjected to lower operating temperatures often benefit from a very different grain structure. For example, gas turbine wheels and discs, while having their own set of performance requirements, often operate at temperatures much lower than those encountered within the hot gas path. In many cases, it is very desirable that these components have a fine equiaxed grain structure.

Although fine equiaxed grain structures are commonly obtained in small castings, they are relatively difficult to produce in large, complex parts, such as the gas turbine airfoils and structural components. The investment casting techniques typically produce cast components having a mixture of columnar and equiaxed grains. This is often the case for large components with thick sections (e.g., sections more than about 10 mm thick). Obtaining the desired fine-grain structure can be especially difficult if the component has a complex geometry, with a wide variation in sectional thickness.

Certain components may be used in ways that expose different sections of the cast component to different environments in use. In such components, it may be desirable to have different grain properties within the different sections of the component. It is currently difficult to produce components with multiple material structures in a single process. In many cases separate parts with different structures are joined to produce a structure. With these general considerations in mind, new methods for casting high-performance alloys would be welcome in the art. The techniques should be especially suitable for manufacturing components that require a controlled, multi-type grain structure in different sections of the component. Moreover, the new developments should also be suitable for casting relatively large components having complex geometries. Furthermore, the techniques should not require substantial changes to current casting operations that would result in significant increases in manufacturing costs.

BRIEF DESCRIPTION

Aspects and advantages will be set forth in part in the following description, or may be obvious from the description, or may be learned through practice of the invention.

Methods for creating a cast component are generally provided, along with the resulting cast components. In one embodiment, the method includes heating a mold having a cavity therein; supplying a first molten metal material into the cavity of the mold such that the first molten metal material is directed to a first portion of the cavity of the mold; supplying a second molten metal material into the cavity of the mold such that the second molten metal material is directed to a second portion of the cavity of the mold, wherein the first molten metal material is compositionally different than the second molten metal material; and thereafter, allowing the first molten metal material and the second molten metal material to form the cast component.

The resulting cast components formed from the methods described herein are also provided. In one embodiment, the cast component may include a first section comprising a first metal material and having first grains with a first average grain size; and a second section comprising a second metal material and having second grains with a second average grain size with the first metal material having a different composition than the second metal material, and with the first average grain size being greater than the second average grain size. In another embodiment, the cast component may include a first section comprising a first metal material and having first grains with a first average grain size; and a second section comprising a second metal material in a single crystal with the first metal material has a different composition than the second metal material.

The cast component may be, for example a bladed disk that includes a plurality of airfoils extending radially outward from an internal disk. In one embodiment, the plurality of airfoils comprise a first cast metal alloy having a plurality of first grains with a first average grain size, and the internal disk comprises a second cast metal alloy having a plurality of second grains with a second average grain size. In such an embodiment, the first average grain size is generally greater than the second average grain size.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

As alluded to previously, a number of metals and metal alloys can be cast according to embodiments of this invention. Examples include the "superalloys," a term intended to embrace iron-, cobalt-, or nickel-based alloys, which may be referred to herein as base metals, with iron, cobalt, and nickel being the base metals of the base alloys. The superalloys usually include one or more additional elements to enhance their high-temperature performance. Non-limiting examples of the additional elements include chromium, aluminum, tungsten, molybdenum, rhenium, ruthenium, zirconium, carbon, titanium, tantalum, niobium, hafnium, boron, silicon, yttrium, and the rare earth metals. Additionally, each of the base alloys may contain one or more of the other base metals as an additional element, e.g., nickel-based alloys containing cobalt and/or iron). Additionally, the casting methods described herein may be applied to other metals and metal alloys, such as stainless steel alloys, etc.

Methods for creating a cast component from multiple metal materials are generally provided herein, along with the resulting cast components. In particular embodiments, the method includes forming cast components with multiple metal materials therein. For example, the cast component may have multiple sections, each section having its own metal material composition and/or its own average grain structure therein. The casting process, in certain embodiments, uses centrifugal force and/or different environmental portions of the mold. In one embodiment, for instance, the method may be utilized to create a cast component having a first section formed from a first metal material (and optionally having relatively large grain structures) and a second section formed from a second metal material (and optionally having a relatively fine equiaxed grain structure) in a single casting process.

Generally, the methods for creating the cast component may include directing a first molten metal material to a first portion of the mold and a different, second molten metal material to a second portion of the mold. As such, the cast component may be formed with multiple sections that vary in composition (e.g., a first section corresponding to the first portion of the mold, a second section corresponding to the second section of the mold, etc.). In particular embodiments, the first molten metal material and the second molten metal material mix together within the mold to form a transition zone within the cast component in a transition area between the first portion and the second portion.

Not only may the cast component include varying, controlled compositional portions, but also the cast component may include varying, controlled grain structures therein. For example, in certain embodiments, the methods for creating such a cast component involve controlling the temperature at various areas of the mold such that different portions of the mold may have different thermal conditions (e.g., different initial temperatures) when the molten metal material is poured therein. For example, the initial temperature a first portion of the mold that is exposed may be different than the initial temperature of a second portion of the mold that is in contact with an insulating material (e.g. a ceramic powder), which may be different than the initial temperature of a third portion of the mold, etc.

In one embodiment, the methods for creating such a cast component involve surrounding the second portion of the mold in a powder of ceramic material while leaving a first portion of the mold exposed. Additional portions may be included within the mold, as desired. The mold and the powder of ceramic material may then be heated (i.e., preheating the mold), such that the second portion within the powder of ceramic material has an initial second portion temperature that is different than an initial first temperature of the first portion defined by the exposed mold. After heating, a molten first metal material may be poured into the mold such that the molten first metal material fills the first portion (corresponding to the exposed mold area). Then, a molten second metal material may be poured into the mold such that the molten second metal material fills the second portion (while in contact with the insulating material). Then, the molten first metal material and the molten second metal material may be allowed to cool to form a cast component. For example, the mold may be allowed to cool while the second portion of the mold is buried within the powder of ceramic material.

Through this method, the resulting cast component has a compositional variation and/or a grain structure controlled therein. For example, a first section of the cast component, corresponding to the first portion of the mold, may have relatively larger grains therein (e.g., predominantly columnar grains therein). Conversely, the cast component may have predominantly fine grains (e.g., with little to no columnar grain growth therein) within a second section of the cast component that corresponds with the second portion of the mold. That is, the second section of the cast component may have a second average grain size that is less than a first average grain size within the first section of the cast component. Thus, an integral cast component may be formed with different properties (e.g., composition and/or grain size) at different areas therein.

Although described above as being the same portions with respect to the compositional differences and temperature differences, it is to be understood that the mold may be portioned, independently, into the compositional portions and thermal condition portions as desired.

Figure 1:
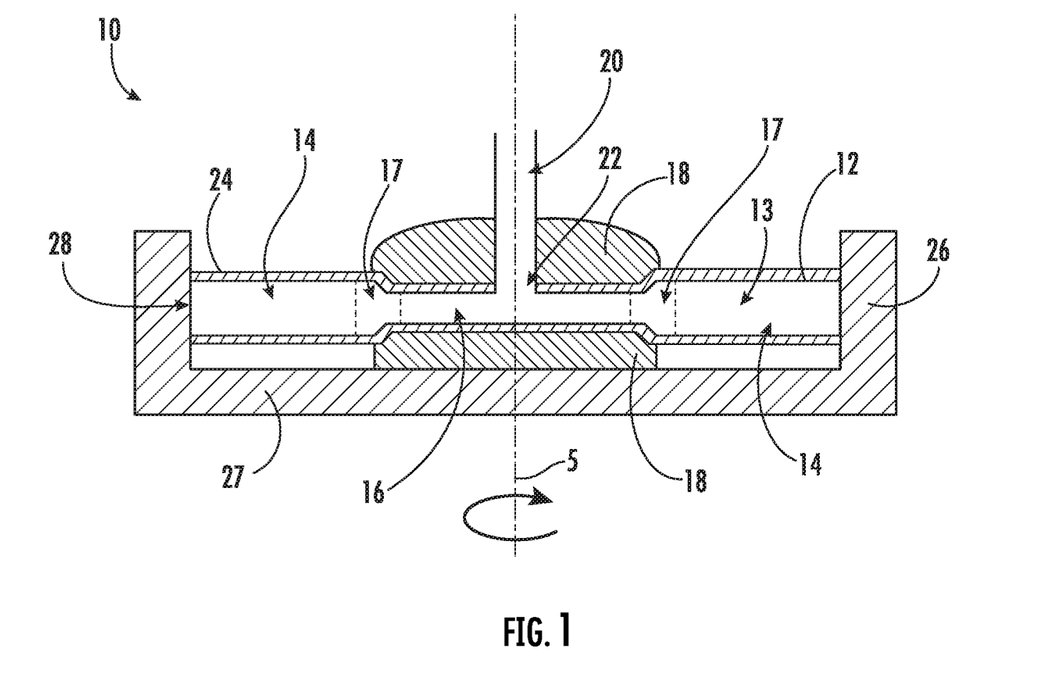
FIG. 1 shows an exemplary casting system for creating a cast component.

Referring to FIG. 1, a cross-section of a casting system 10 is generally shown for use in the methods of creating a cast component. The casting system 10 includes a mold 12 defining a cavity 13, and generally defines a center axis 5 to which any following discussion of "radial" or "radially" references. The mold 12 has a first portion 14 (i.e., a radially outer portion) and a second portion 16 (i.e., a radially inner portion), and optionally additional portions as desired. In the embodiment shown, the first portion 14 of the mold 12 is exposed (i.e., not in contact with an insulating material) and the second portion of the mold 12 is surrounded by an insulating material 18 (e.g., a powder of ceramic material). The cavity 13 may further include links spanning therethrough, which result in channels within the resulting cast component (e.g., flow channels within an airfoil).

A supply line 20 is fluidly connected to the cavity 13 of the mold 12 to supply molten metal material to the cavity 13. The supply line 20 may be formed as part of the mold 12 and may be connected to the cavity 13 at a single inlet 22 (as shown) or at multiple inlets. As such, the molten metal material may be simultaneously supplied into the cavity 13 at various multiple locations.

The mold 12 may be mounted onto a base 27 that is rotatable about the center axis 5. In one embodiment, the rotational speed of the mold 12 may be controlled as desired, so as to impart a controlled centrifugal force onto the molten metal material within the cavity 13.

Figure 2:
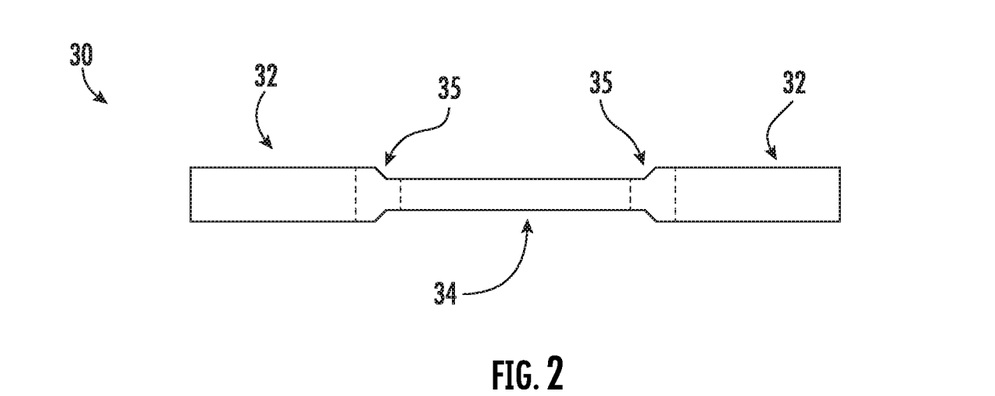
FIG. 2 shows the cast component formed via a method utilizing the casting system of FIG. 1.

As stated, the casting system 10 may be utilized to form a cast component 30 (such as shown in FIG. 2) with controlled composition and/or grain structures therein. In one particularly embodiment, a first molten metal material may be supplied into the cavity 13 of the mold 12 (e.g., through the line 20 and inlet 22) such that the first molten metal material is directed to the first portion 14. For instance, the mold 12 may be rotated, while the first molten metal material is supplied into the cavity 13, at a rotational speed sufficient to move the first molten metal material within the cavity 13 radially outwardly to the first portion 14. Then, upon filling the first portion 14 of the mold 12 with the first molten metal material, a different second molten metal material may be supplied into the cavity 13 of the mold 12 (e.g., through the line 20 and inlet 22). Since the first portion 14 is full with the first molten metal material, the second molten metal material fills the second portion 16 of the cavity 13 of the mold 12.

The first molten metal material and the second molten metal material may then be allowed to form a cast component 30, referring to FIG. 2, by solidifying in their respective portions of the mold 12. As shown, a first section 32 of the cast component 30 corresponds to the first portion 14 of the mold 12, and a second section 34 of the cast component 30 corresponds to the second portion 16 of the mold 12.

In one embodiment, the first molten metal material is completely supplied into the cavity 13 before supplying any of the second molten metal material into the cavity 13. However, in other embodiments, the second molten metal material may be introduced into the cavity 13 while the first molten metal material is still being supplied therein. As such, the first molten metal material and second molten metal material may be supplied together to form the transition area 17 (either through the same supply line 20 or through multiple supply lines).

In one particular embodiment, the first molten metal material and the second molten metal material mix together within a transition area 17 of the mold 12 between the first portion 14 and the second portion 16, as shown in FIG. 1. Thus, a compositional gradient can be formed within a transition zone 35 within the cast component 30 (as shown in FIG. 2) that corresponds to the transition area 17 of the mold 12 (as shown in FIG. 1). The transition zone 35 may have a compositional gradient within the cast component 30 spanning from the first section 32 (primarily the first metal material) and the second section 34 (primarily the second metal material).

In most embodiments, the mold 12 may be rotated during the supply of both the first and second molten metal materials into the cavity 13. As such, the respective flow of the first and second molten metal materials may be controlled, resulting in control of the location of the first and second metal materials in the resulting cast component 30.

The first portion 14 may be primarily filled with the first metal material, such as 75% by weight or greater (e.g., 90% by weight or greater, or 99% by weight or greater). Conversely, the second portion 16 may be primarily filled with the second metal material, such as 75% by weight or greater (e.g., 90% by weight or greater, or 99% by weight or greater).

As stated, an insulating material 18 may be included within the casting system 10 to control the grain size of the resulting cast component formed within the mold 12. In one particular embodiment, the insulating material 18 is a powder of an insulating ceramic material (e.g., insulating ceramic oxides). For example, in one embodiment, the ceramic material of the powder may include alumina (e.g., tabular alumina), which has a relatively high thermal conductivity, as the insulating ceramic material. As such, the insulating ceramic material may keep the second portion 16 of the mold 12 at a lower temperature than the exposed first portion 14 when the first and second molten metal material is poured into the mold 12. Without wishing to be bound by any particular theory, it is believed that the insulating ceramic material is preventing the mold from heating up during the preheat, which leads to the finer grain size. Additionally, the insulating ceramic material may provide a path to conduct heat throughout the powder so as to minimize any thermal gradient across the second portion 16 of the mold 12. Other insulating ceramic oxides that may be suitable for use as the ceramic material of the powder include, but are not limited to, zirconia, hafnia, titania, silica, cobalt aluminate, zircon, silica, magnesia, a rare earth oxide (e.g., yttria), or mixtures thereof.

The ceramic material of the powder generally comprises a plurality of ceramic particles (i.e., a powder of ceramic particles). In certain embodiments, the powder has relatively small sized particles (e.g., an average particle size of about 10 mm or less, preferably about 1 mm or less) such that maximum contact can be made with the exterior surfaces of the mold 12. In particular embodiments, the particles may have an average particle size of about 0.25 mm to about 0.85 mm.

In contrast to the second portion 16, the first portion 14 of the mold 12 is exposed to the atmosphere surrounding the mold 12. That is, the first portion 14 is not in contact with the insulating material 18 (e.g., ceramic powder). As such, the first portion 14 of the mold 12 may be heated and cooled more quickly compared to the second portion 16 of the mold 12.

Without wishing to be bound by any particular theory, it is believed that the grain size of the cast component 30 may be tailored and controlled through adjusting location of the insulating material 18. Additionally, it is believed that the grain size of the cast component 30 may be further tailored and controlled through adjusting the initial mold temperature, the material temperature of the molten metal material, and/or the elevated mold temperature reached after pouring the metal material therein. In one particular embodiment, the mold 12 may be heated to an initial first mold temperature for the first portion 14 and an initial second mold temperature for the second portion 16. After heating to the initial first mold temperature and second mold temperature, the heat source may be disengaged, and the molten metal material may be poured into the mold 12 while at the initial first mold temperature and initial second mold temperature.

In one embodiment, the initial second mold temperature is half or less of the solidus temperature of the metal material to be poured therein. As used herein, the term "solidus temperature" refers to the generally agreed upon temperature at which the material is completely solid on cooling under equilibrium conditions. In one embodiment, the initial second mold temperature may be 90% of the solidus temperature of the metal material or less, such as 75% of the solidus temperature of the metal material or less (e.g., room temperature of about 20° C. to 75% of the solidus temperature of the metal material). For example, the initial second mold temperature may be 5% of the solidus temperature to 90% (e.g., 5% of the solidus temperature to 75%) of the solidus temperature of the metal material (e.g., 7% to less than 50% of the solidus temperature of the metal material), such as 10% to 25% of the solidus temperature of the metal material. When the initial second mold temperature is half or less of the solidus temperature of the metal material, it is believed that the molten metal material quickly cools from its liquid phase upon being poured into the mold 12. As such, it is believed that the second molten metal material may begin to crystalize while it fills the second portion 16 of the mold 12 such that the second molten metal material begins to form its grain structure upon pouring. Without wishing to be bound by any particular theory, it is believed that these grains may serve as seed sites for grain formation at the desired size. Such an embodiment may be particularly useful for components having large cavities to fill with the molten metal material.

While the molten metal is being poured into the cooler mold, it is believed, without wishing to be bound by any particular theory, that thermal energy transfers from the metal material to the mold. In the second portion, the thermal energy transfers to the insulating material. That is, the metal material cools while the second portion of the mold heats, which in turn causes the insulating material surrounding the second portion to heat. On the other hand, the thermal energy transfers to the surrounding atmosphere within the first portion of the mold.

Generally, this controlled solidification process is allowed to occur until the metal material completely solidifies within the mold. As discussed below, the mold may then be quickly cooled, upon complete solidification of the metal material, to inhibit grain growth within the second section of the cast metal component corresponding to the second portion of the mold. During the controlled solidification process, the molten metal material heats the second portion of the mold from its initial second mold temperature (i.e., the temperature of the second portion of the mold when the molten metal material is poured therein) to an elevated second mold temperature upon which the molten metal material is completely solidified within the mold. The elevated second mold temperature may depend on a variety of factors, such as the initial second mold temperature, the volume and/or temperature of the molten metal material at pouring, the amount and/or type of insulating material present, the size and/or thickness of the mold, etc. For example, in certain embodiments, the elevated second mold temperature may be greater than 25% of the solidus temperature of the second metal material (e.g., greater than 25% to 110% of the solidus temperature). For instance, the elevated second mold temperature may be 50% to 85% of the solidus temperature of the second metal material (e.g., 60% to 75% of the solidus temperature).

When the insulating material 18 is a ceramic powder, the amount of ceramic powder that is present in the cavities surrounding the second portion 16 may be greater, in terms of thermal mass, than the volumetric amount of metal material poured into the second portion 16. For example, thermal mass ratio may be defined by the volume of ceramic material to the volume of metal material within the second portion 16 of the mold 12. In this definition, the thermal mass ratio may be greater than 1, indicating that there is more thermal mass of the powder than the poured metal material within the second portion 16. In particular embodiments, the thermal mass ratio may be about 2 or greater (e.g., about 5 or greater, such as about 10 or greater).

Conversely, during the controlled solidification process, the molten metal material heats the first portion 14 of the mold 12 from its initial first mold temperature (i.e., the temperature of the first portion of the mold when the molten metal material is poured therein) to an elevated first mold temperature upon which the molten metal material is completely solidified within the mold. The elevated first mold temperature may depend on a variety of factors, such as the initial first mold temperature, the volume and/or temperature of the molten metal material at pouring, the amount and/or type of ceramic material present, the size and/or thickness of the mold, etc. For example, in certain embodiments, the elevated first mold temperature may be greater than 25% of the solidus temperature of the metal material (e.g., greater than 25% to 110% of the solidus temperature). For instance, the elevated first mold temperature may be 50% to 85% of the solidus temperature of the metal material (e.g., 60% to 75% of the solidus temperature).

In particular embodiments, the mold 12 has a wall 24 surrounding a cavity 13 into which the molten metal material flows. The mold wall 24 may have a uniform or non-uniform thickness. For example, the mold wall 24 may have a thickness that ranges from 1 mm to 50 mm (e.g., 2 mm to 10 mm).

The mold 12 may be made out of a ceramic material, which is independently selected from the ceramic material of the powder, when utilized as the insulating material 18. For example, the mold 12 may be formed from alumina, zirconia, hafnia, titania, silica, cobalt aluminate, zircon, silica, magnesia, a rare earth oxide, or a mixture thereof.

In certain embodiments, the first and second molten metal material are poured into the mold near its liquidus temperature. As used herein, the term "liquidus temperature" refers to the lowest temperature at which the metal material (e.g., an alloy) is completely liquid. For example, the first and second molten metal material may be poured at a pour temperature that may be about 80% of the liquidus temperature to 120% of the liquidus temperature of the metal material, such as about 85% of the liquidus temperature to 115%. When the pour temperature is at or above the liquidus temperature (e.g., 100% to about 120%) of the metal material, it is believed that the molten metal material may stay completely in the liquid phase while the mold is being filled such that the molten metal material completely fills the mold in a substantially uniform manner. Such an embodiment may be particularly useful for components having small structures through which the molten metal material fills. Alternatively, when the pour temperature is below the liquidus temperature (e.g., about 80% to less than 100%, such as about 90% to less than 100% or about 95% to less than 100%) of the metal material, it is believed that the molten metal material may begin to crystalize while it fills the mold such that the molten metal material begins to form its grain structure upon pouring. That is, crystals may form within the molten metal material, when the pour temperature is lower than the liquidus temperature, such that smaller grains already started to form prior to the rest of the material crystalizing. Without wishing to be bound by any particular theory, it is believed that these grains may serve as seed sites for grain formation at the desired size. Such an embodiment may be particularly useful for components having large cavities to fill with the molten metal material.

In one embodiment, the metal material (for the first metal material and the second metal material, independently) may include, but is not limited to, pure metals, nickel alloys, chrome alloys, iron alloys, titanium, titanium alloys, magnesium, magnesium alloys, aluminum, aluminum alloys, nickel-based superalloys, cobalt-based superalloys, iron-based superalloys or mixtures thereof.

As stated, the mold 12 forms a cast component 30, such as shown in FIG. 2 upon cooling. Generally, the first portion 14 of the mold 12 generally corresponds to a first section 32 (e.g., a radially outer section as shown) of the cast component 30, and the second portion 16 of the mold 12 generally corresponds to a second section 34 (e.g., a radially inner section as shown) of the cast component 30.

Without wishing to be bound by any particular theory, it is believed that the methods described herein may help control the composition within the cast component and help achieve significantly fine grain structure within the second section of the cast component, corresponding to the second portion of the mold, by decreasing the thermal gradient within the metal material during final solidification. Without wishing to be bound by any particular theory, it is believed that the ceramic bed provides a medium into which the thermal gradient is formed surrounding the second portion, outside of the mold, to allow for more unified cooling within the second portion of the mold. That is, a thermal gradient can be formed within the powder of ceramic material around the second portion after pouring the molten metal material into the mold, such that the thermal gradient essentially shifts from the metal material within the second portion of the mold and into the ceramic powder outside of the mold. As such, the resultant grain structure within the second section of the cast component has a substantially uniform grain structure across thin and thick sections with little to no columnar grain growth.

Conversely, the first portion may include grain sizes that are larger in size than the grain sizes in the second portion. In one particular embodiment, the grain size within the first portion may have an aspect ratio (i.e., the longest measurement of the grain divided by the smallest measurement of the grain) that is relatively large compared to that of the grains in the second portion. That is, the grains within the first portion may be columnar in nature. In particular embodiments, the grains within the first portion may have an aspect ratio of 2 or greater (e.g., of 3 or greater, such as 3 to 25). The first portion may include, in one embodiment, a single crystal grown from a starter seed crystal within the cavity 13 within the first portion.

In one embodiment, at least one edge 28 of the first portion 14 may be cooled during the solidification. Without wishing to be bound by any particular theory, it is believed that a temperature gradient may be formed within the first portion 14 of the mold 12 to create columnar grains extending in the direction toward the cooling source (e.g., a chiller). Referring to FIG. 1, for example, a chiller 26 may be positioned on the outer edge 28 of the first portion 14 so as to orient the columnar grains radially in this particular embodiment of the cast component 30.

In particular embodiments, the chiller 26 may reduce the temperature of the edge 28 to a temperature that is less than the initial first mold temperature of the first portion 14 of the mold 12. For example, the chiller 26 may be a liquid-cooled plate (e.g., a water-cooled copper plate). The temperature of the chiller 26 may be controlled for the component being created by the casting process. However, in most embodiments, the chiller 26 has a chiller temperature that is less than the temperature of the insulating material 18, less than the initial first mold temperature of the first portion 14 of the mold 12, and/or less than the initial second mold temperature of the second portion 16 of the mold 12. In particular embodiments, the chiller 26 has a chiller temperature that is at least 10% lower than the initial first mold temperature of the first portion 14 of the mold 12, such as at least 20% lower than the initial first mold temperature of the first portion 14 of the mold 12.

The chiller 26 may be engaged before pouring of the first and second molten metal materials, during pouring of the first and second molten metal materials, and/or after pouring of the first and second molten metal materials. In particular embodiments, the chiller 26 is engaged as the pouring of the first molten metal material begins (i.e., substantially simultaneously with the introduction of the first molten metal material to the mold 12) and remains engaged during solidification of the first and second molten metal materials within the mold 12.

For example, the cast component 30 may have a grain structure within the second portion 16 that has an average grain size of about 250 micrometers (μm) or less, such as about 10 μm to about 250 μm (e.g., about 25 μm to about 200 μm, or about 25 μm to about 100 μm). Additionally, the grains within the second portion 16 may have an average grain size and shape with a relatively low aspect ratio, such as 2 or less (e.g., 0.5 to 2). Alternatively, the cast component 30 may have a grain structure within the first portion 14 that has a larger average grain size than the average grain size within the second portion 16. The grains within the first portion 14 may also have an aspect ratio of 2 or greater, as discussed above, such that the grains within the first portion have a more columnar shape than the grains within the second portion 16.

In additional embodiments, a transition area 17 (i.e., an intermediate portion or a third portion) of the mold 12 may form a transition zone 35 within the cast component having grains that are larger than the grains of the second section 34 formed within the second portion 16, but less columnar than the grains within the first section 32 formed within the first portion 14. That is, the grains of the second section 34 have an average aspect ratio that is less than the average aspect ratio of the grains of the first section 32 and of the grains of the transition zone 35.

Figure 3:
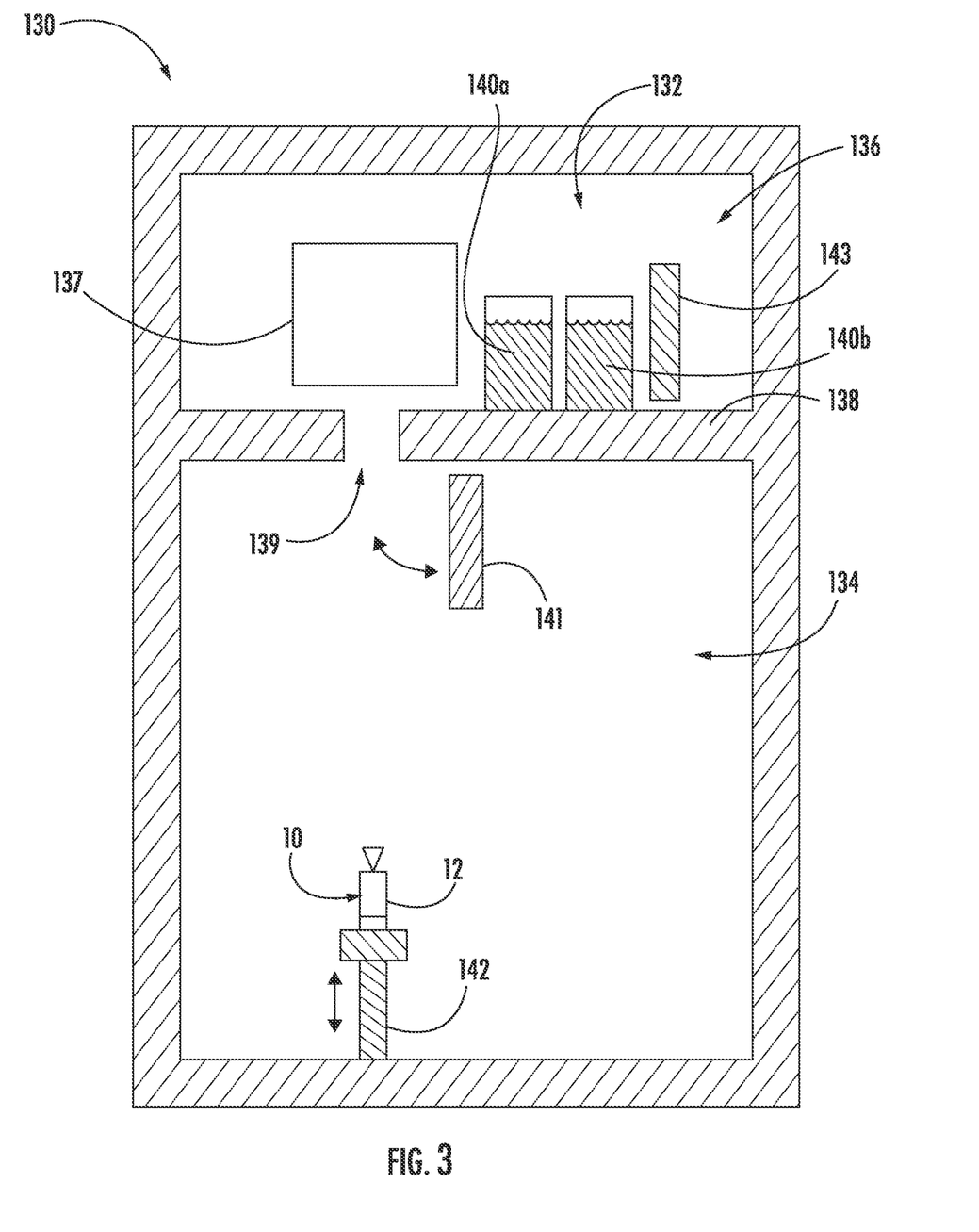
FIG. 3 shows an exemplary vacuum melter that may be used with the casting system of FIG. 1.

Referring to FIG. 3, the casting system 10 is shown within an exemplary vacuum melter 130, such as a vacuum induction melter, a vacuum resistance heater, etc. In the embodiment shown, a chamber 132 defines a loading area 134 and a pouring area 136 separated from each other by an inner wall 138. In the loading area 134, the mold 12 may be placed on the lift 142, and then lifted, while the second portion remains within the insulating material, into the pouring area 136 through an aperture 139 between the loading area 134 and the pouring area 136. As shown, a valve arm 141 may close the aperture 139 in order to separate the loading area 134 from the pouring area 136. For example, the valve arm 141 may pivot to close the aperture 139. In other embodiments, the valve arm 141 may be configured to slide into place to close the aperture 139.

The mold heater 137 may preheat the mold, while the second portion is surrounded within the insulating material, to the initial first and second mold temperatures, as discussed above. Additionally, a metal heater 143 may heat the first metal material 140*a* and second metal material 140*b* to the pour temperature within the pouring area 136 (e.g., about 90% of the liquidus temperature up to about 120% of the liquidus temperature, as discussed above). Then, the first molten metal material 140*a* may be poured into the mold 12 while the mold 12 is rotated around its center axis, as discussed above. Then, the second molten metal material 140*b* may be poured into the mold 12 while the mold 12 is rotated around its center axis, as discussed above.

In one embodiment, the chamber 132 may be free from oxygen during pouring of the molten metal material 140*a*, 140*b* so as to prevent oxidation of the metal material. In certain embodiments, a vacuum may be formed within the chamber 132. For example, the chamber 132 may have a pressure that is less than 760 torr (e.g., about 300 torr or less). In particular embodiments, the chamber may have a pressure that is about 1 torr or less (e.g., about 0.1 millitorr to about 25 millitorr). In conditions having a pressure that is greater than 1 torr, it may be preferable to have an inert gas (e.g., argon) purge the chamber prior to drawing the vacuum so as to ensure that the atmosphere is substantially free from oxygen.

After pouring of the molten metal material 140*a*, 140*b*, the molten metal material 140*a*, 140*b* is cooled within the mold 12, while the second portion is surrounded by the insulating material 18. In certain embodiments, cooling may begin soon after the mold 12 is filled with the second molten metal material 140*b*. For example, upon completion of pouring, the mold 12 may be lowered back into the loading area 134 without any heating elements being used (i.e., any heating sources are disengaged). For example, the valve arm 141 may close the aperture 139 such that the loading area is isolated from the heating elements 137 and 143 in the pouring area 136. As such, the metal material 140*a*, 140*b* may be allowed to cool within the mold 12. Once the metal material 140*a*, 140*b* solidifies completely within the mold 12 (e.g., at an elevated mold temperature), the mold 12 may be cooled quickly to control grain growth within the cast metal component. For example, in one particular embodiment, the insulating material 18 may be removed from around the second portion 16 of the mold 12 after it has completely solidified to allow the metal material 140*a*, 140*b* and the mold 12 to cool on its own.

In one embodiment, the molten metal material 140*a*, 140*b* may be subjected to an overpressure (e.g., a pressure furnace) to provide a force to drive the molten metal material into the mold. Such an overpressure may be especially useful in embodiments where the molten metal material is poured at a temperature that is less than the liquidus temperature. In embodiments where an overpressure is used, a pressure may be formed that is greater than 760 torr to about 3000 torr (e.g., 1000 torr to about 2500 torr) within the chamber 132. Such a pressure may be made with an inert gas (e.g., argon, nitrogen, etc.) so as to prevent oxidation of the cast component.

The crystal structure and grain size may also be impacted by various combinations of gating, shelling, other mold insulation (e.g. Kaowool® (refractory blanket), Fiberfrax® (insulating blankets), graphite baffles), vibration, chills, heater designs, or cooling gases (e.g. Air, Argon, Helium, Nitrogen) during the casting cycle to affect the resultant crystal structure as well.

Such control of the chemical composition and/or grain structure of the cast component allows the designer to tailor the properties of the component depending on the location (portion) of the component. For example, a finer grain structure within the second section may allow for improved strength and cyclic capability. Conversely, a more columnar grain structure within the first section may allow for improved time dependent mechanical properties (e.g., creep deformation). This type of control is particularly suitable for rotary components used, for example, in turbine engines.

While the presently disclosed methods are suitable for a variety of applications, the methods are particularly suitable for forming cast components found in high temperature environments, such as those present in gas turbine engines, for example, combustor components, turbine blades, shrouds, nozzles, heat shields, and vanes. As stated above, the methods described herein are particularly useful for forming cast components for rotary machines, such as turbine engines. For example, a bladed disk may be formed with the second section corresponding to an internal disk area and the first section corresponding to the airfoils extending radially outwardly from the disk.

Figure 4:
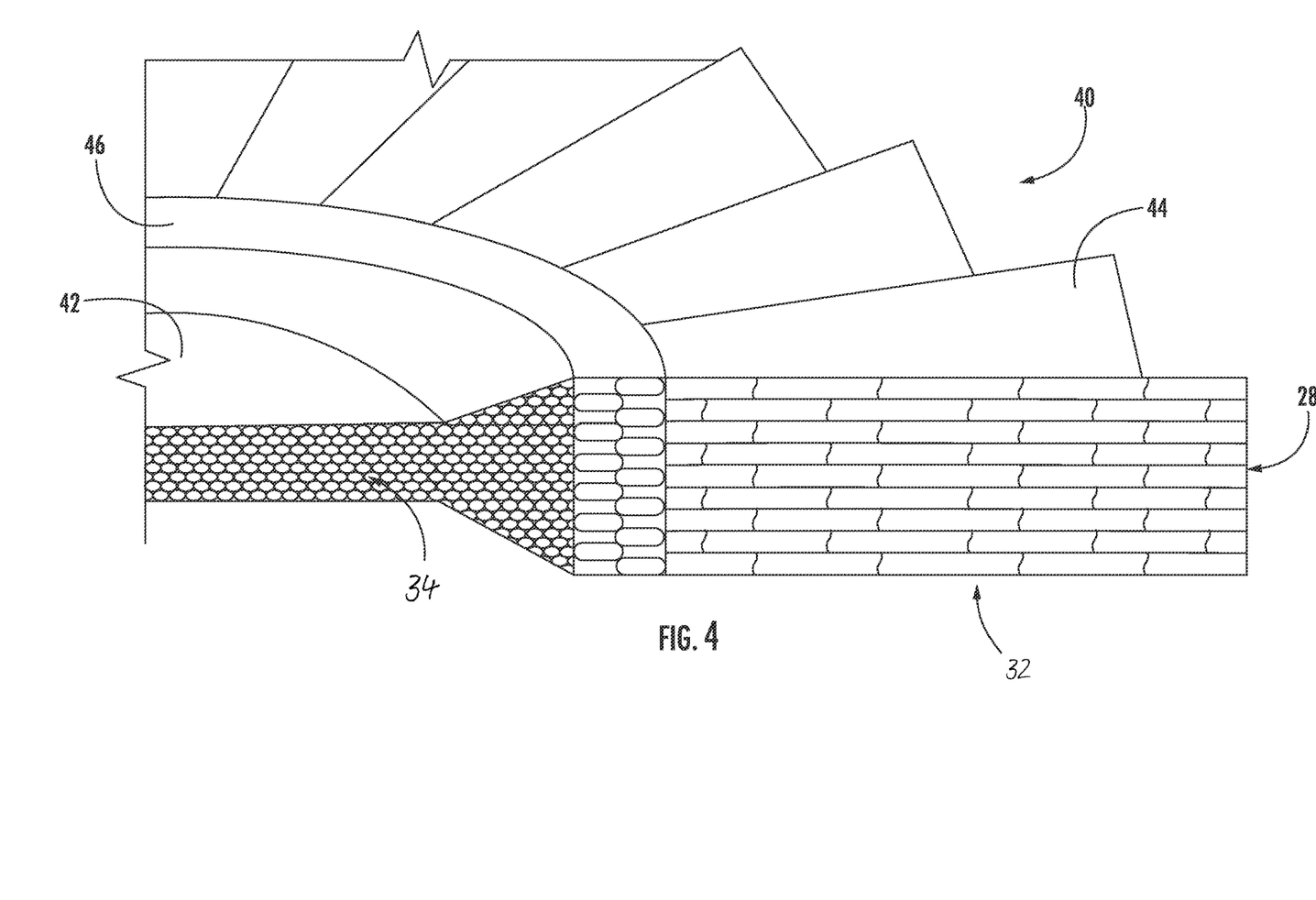
FIG. 4 shows a cross-sectional view of an exemplary bladed disk formed according to methods described herein.

FIG. 4 is a schematic cross-sectional view of a turbine engine component 40 in accordance with an exemplary embodiment of the present disclosure. More particularly, for the embodiment of FIG. 4, the turbine engine component is a bladed disk that includes an internal disk 42 having a plurality of airfoils 44 extending radially outwardly therefrom. The internal disk and the plurality of airfoils are integrally formed during the casting processes to be a unibody component. The internal disk 42 is, in the depicted embodiment, separated from the airfoils 44 by a platform 46. The internal disk 42 has relatively small grains compared to the airfoils 44. Although shown with relatively spherical grains in FIG. 4, it is understood that the relatively small grains within the internal disk 42 refer to an aspect ratio of less than 2, as discussed above, and do not require any rounded shape, regular shape, etc. The platform 46 may serve as a "transition zone" that may have a grain size gradient that transitions from the first section 32 having relatively columnar grains to the second section 34 having relatively smaller grain sizes. Although shown with relatively straight columns in FIG. 4, it is understood that the columnar grains within the airfoils 44 refer to an aspect ratio of greater than 2, as discussed above, and do not require any straight sides, edges, regular shape, etc. As such, the platform 46, like the third section discussed above, may have a plurality of third grains with a third average grain size that is larger than the second average grain size within the internal disk 42 and/or smaller than the first average grain size within the airfoils 44.

In one embodiment, the airfoils 44 (e.g., the first section 32 corresponding to the first portion 14) may comprise a columnar grained Ni-based superalloy including but not limited to Rene 142™ or a single crystal nickel-based superalloy such as Rene N5™. For example, the airfoils 44 may comprise such a Ni-based superalloy in an amount of at least 75% by weight or greater (e.g., 90% by weight or greater, or 99% by weight or greater).

Conversely, the internal disk 42 (e.g., within the second section 34 corresponding to the second portion 16) may comprise a polycrystalline nickel-chromium-based superalloy including but not limited to Inconel 718® (UNS N07718, a Nickel alloy). For example, the internal disk 42 may comprise the nickel-chromium-based superalloy in an amount of at least 75% by weight or greater (e.g., 90% by weight or greater, or 99% by weight or greater).

Such a bladed disk 40 may be used in any turbine engine, such as a high-bypass turbofan jet engine, turbojet, turboprop and turboshaft gas turbine engines, including industrial and marine gas turbine engines and auxiliary power units. Using the methods, the designer may align the superalloy properties and/or the grain boundaries with the stress conditions applied on the particular section of the component.

Figure 5:
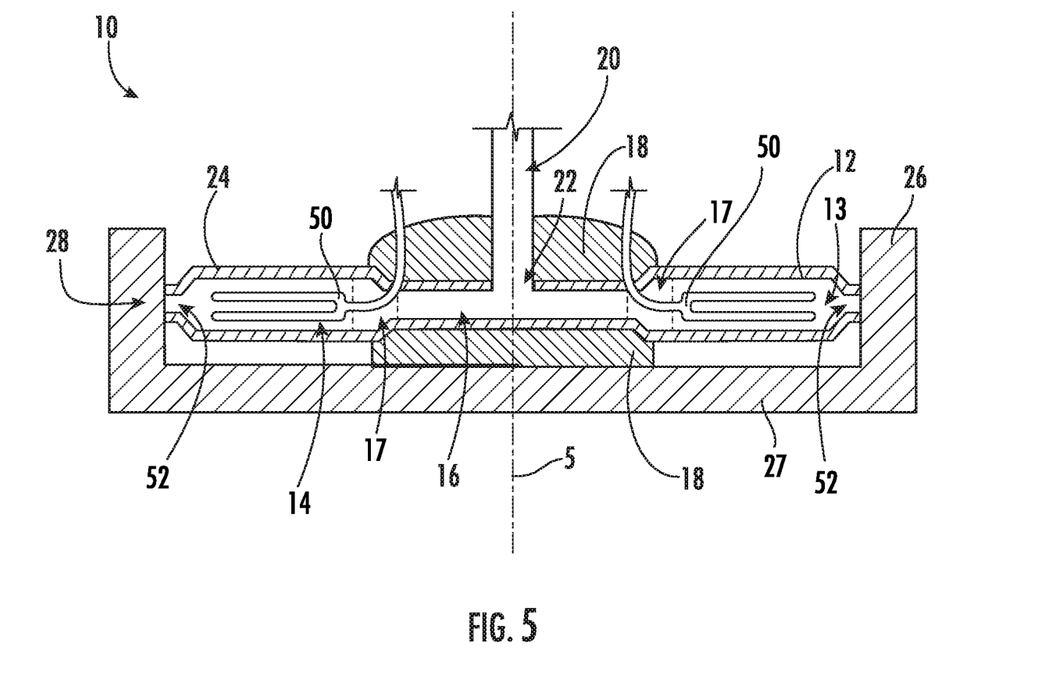
FIG. 5 shows another exemplary casting system for creating a cast component.

In other embodiments, single crystal airfoils that contain at least one internal cooling passages may be formed. Such components may be formed as a ring of airfoils, a multiple airfoil segment, a complete bladed disk, or similar components. Referring to FIG. 5, for example, a cross-section of another exemplary casting system 10 (similar to that shown in FIG. 1) is generally shown for use in the methods of creating a cast component. The casting system 10 includes a mold 12 defining a cavity 13, and generally defines a center axis 5. As stated, the casting system 10 may be utilized to form a cast component with controlled composition and/or grain structures therein.

In addition to the components described above with respect to FIG. 1, the casting system 10 of the embodiment shown in FIG. 5 includes internal ceramic core passages formed from ceramic cores 50 extending into the first portion 14 of the mold 12 (e.g., forming an air foil airfoil in the shown embodiment). The ceramic cores 50 may have any suitable shape to form the particular internal configuration desired. For example, core cooled airfoils, hollow airfoils, and the like may be formed utilizing the casting system 10.

In one embodiment, the casting system 10 of FIG. 5 may be utilized to form a single crystal airfoil. For example, a starter seed crystal may be positioned in the edge zone 52 of the cavity 13. In such an embodiment, the first portion 14 may be formed of a single crystal (e.g., for the airfoil). The second portion 16 may be formed by casting with a controlled grain size as described above (e.g., fine, course, or columnar). A transition area 17 may be formed between the first portion 14 and the second portion 16. The transition area 17 may include a controlled grain size as described above (e.g., fine, course, or columnar) that is different than the single crystal of the first portion 14 and the grain size within the second portion 16. For example, the second portion 16 may have grain size that is finer than the grain size in the transition area 17, while the first portion 14 has a single crystal.

Figure 6:
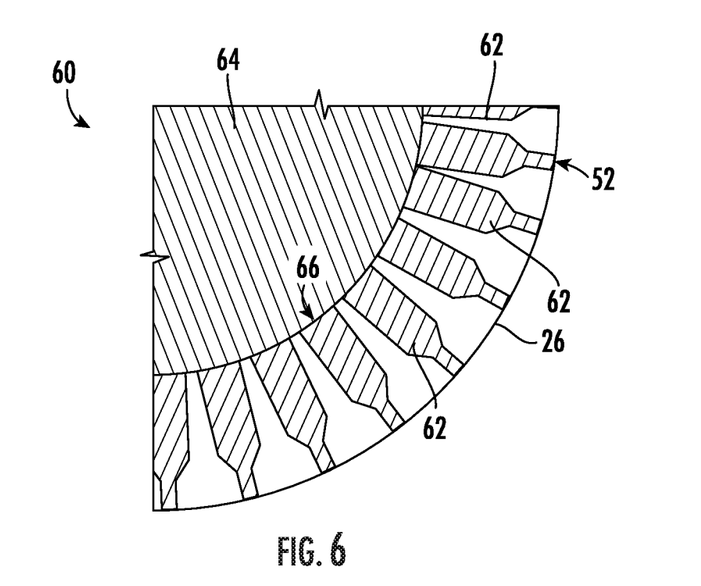
FIG. 6 shows an exemplary cast component formed by a method described herein.

FIG. 6 shows a bladed disk 60 (i.e., a "blisk") that has multiple airfoils 62 extending from a disk 64 at an airfoil platform 66. As shown, each of the airfoils 62 may be formed with a single crystal material utilizing a starter seed crystal positioned in the edge zone 52.

Further aspects of the invention are provided by the subject matter of the following clauses:

1. A method of creating a cast component, the method comprising heating a mold having a cavity therein; supplying a first molten metal material into the cavity of the mold such that the first molten metal material is directed to a first portion of the cavity of the mold; supplying a second molten metal material into the cavity of the mold such that the second molten metal material is directed to a second portion of the cavity of the mold, wherein the first molten metal material is compositionally different than the second molten metal material; and thereafter, allowing the first molten metal material and the second molten metal material to form the cast component.

2. The method of any preceding clause, wherein heating the mold comprises: heating the mold under controlled conditions such that the first portion of the cavity has a first thermal condition and the second portion of the cavity has a second thermal condition that is different than the first thermal condition.

3. The method of any preceding clause, wherein the second portion of the mold is surrounded by an insulating material.

4. The method of any preceding clause, wherein the insulating material is a powder of ceramic material.

5. The method of any preceding clause, wherein the powder of ceramic material comprises alumina, zirconia, hafnia, titania, silica, cobalt aluminate, zircon, silica, magnesia, a rare earth oxide, or a mixture thereof.

6. The method of any preceding clause, wherein the powder of ceramic material has a thermal mass such that a thermal mass ratio, defined by the volume of ceramic material to the volume of metal material within the second portion of the mold, is greater than 1.

7. The method of any preceding clause, wherein the powder comprises ceramic particles having an average particle size of about 1 cm or less.

8. The method of any preceding clause, wherein the first portion of the mold is exposed.

9. The method of any preceding clause, wherein the first molten metal material is an alloy or a superalloy, and wherein the second molten metal material is an alloy or a superalloy.

10. The method of any preceding clause, wherein the first molten metal material and the second molten metal material mix together within the mold to form a transition zone within the cast component in a transition area between the first portion and the second portion.

11. The method of any preceding clause, wherein the transition zone has a compositional gradient within the cast component spanning from the first molten metal material corresponding to the first portion to the second molten metal material corresponding to the second portion.

12. The method of any preceding clause, wherein at least a portion of the first molten metal material is supplied into the cavity before supplying any of the second molten metal material into the cavity.

13. The method of any preceding clause, wherein the first molten metal material is completely supplied into the cavity before supplying any of the second molten metal material into the cavity.

14. The method of any preceding clause, wherein the mold is rotatable around an axis.

15. The method of any preceding clause, further comprising: rotating the mold around the axis while supplying the first molten metal material into the cavity.

16. The method of any preceding clause, wherein the mold is rotated around the axis at a rotational speed sufficient to enact centrifugal force onto the first molten metal material within the cavity.

17. The method of any preceding clause, wherein the first molten metal material flows radially outwardly within the cavity.

18. The method of any preceding clause, further comprising: rotating the mold around the axis while supplying the second molten metal material into the cavity.

19. The method of any preceding clause, wherein the mold is rotated around the axis at a rotational speed sufficient to enact centrifugal force onto the second molten metal material within the cavity.

20. The method of any preceding clause, wherein the cast component has a center axis, and wherein the first molten metal material defines a radially outer section from the center axis of the cast component, and wherein the second molten metal material defines a radially inner section from the center axis of the cast component.

21. The method of any preceding clause, wherein the cast component further comprises a transition zone between the first molten metal material and the second molten metal material.

22. The method of any preceding clause, wherein the transition zone comprises a mixture of both the first molten metal material and the second molten metal material.

23. The method of any preceding clause, wherein the mold is heated such that the first portion has an initial first portion temperature and the second portion has an initial second temperature that is different than the initial first portion temperature.

24. The method of any preceding clause, wherein the initial first portion temperature is greater than the initial second portion temperature.

25. The method of any preceding clause, wherein the cast component has a first section corresponding to the first portion of the mold and having a first average grain size therein, and wherein the cast component has a second section corresponding to the second portion of the mold and having a second average grain size therein; wherein the first average grain size is greater than the second average grain size.

26. The method of any preceding clause, wherein the cast component has a first section corresponding to the first portion of the mold and having a first average grain size therein, and wherein the cast component has a second section corresponding to the second portion of the mold and having a second average grain size therein; wherein the first average grain size has a higher average aspect ratio than the second average grain size.

27. The method of any preceding clause, wherein the first average grain size is more columnar than the second average grain size.

28. The method of any preceding clause, wherein the second average grain size is 250 micrometers or less.

29. The method of any preceding clause, wherein the first section comprises a single crystal.

30. The method of any preceding clause, further comprising: cooling an outer edge of the first portion of the mold.

31. The method of any preceding clause, wherein the edge of the second portion of the mold is cooled such that a temperature gradient exists within the first portion of the mold.

32. The method of any preceding clause, further comprising: after heating the mold and prior to supplying the first molten metal material and supplying the second molten metal material, disengaging any heat source from the mold such that the first molten metal material and the second molten metal material form the cast component without any application of heat from a heat source.

33. The method of any preceding clause, wherein the first molten metal material and the second molten metal material is supplied into the mold while in a chamber defined within a vacuum melter, wherein the chamber of the vacuum melter has an atmosphere having a pressure of that is less than 1 atm.

34. The method of any preceding clause, wherein allowing the first molten metal material and the second molten metal material to form the cast component comprises: cooling the first molten metal material and the second molten metal material.

35. The method of any preceding clause, wherein cooling the first molten metal material and the second molten metal material comprises: removing the mold from the vacuum melter after the first molten metal material and second molten metal material are poured therein; allowing the first molten metal material and the second molten metal material to heat the mold while the second portion is surrounded with the powder of ceramic material until the molten metal material is completely solidified within the mold; and thereafter, removing the mold from the powder of ceramic material and allowing the mold to cool.

36. The method of any preceding clause, wherein allowing the mold to cool is performed while subjecting the mold to an overpressure.

37. The method of any preceding clause, wherein the overpressure is formed using a cooling atmosphere having a pressure of greater than 760 torr to about 3000 torr, and wherein the cooling atmosphere comprises an inert gas.

38. The method of any preceding clause, wherein the second molten metal material has a solidus temperature and a liquidus temperature, and wherein the mold is heated such that the second portion within the powder of ceramic material is heated to an initial second portion temperature that is 75% or less of the solidus temperature of the metal material.

39. The method of any preceding clause, wherein the mold is constructed from a ceramic material.

40. The method of any preceding clause, wherein the second portion is surrounded by a powder of ceramic material, and wherein the ceramic material of the mold has a different composition than the ceramic material of the powder.

41. The method of any preceding clause, wherein the ceramic material of the mold comprises an insulating ceramic oxide.

42. The method of any preceding clause, wherein an internal ceramic core is positioned within the first portion of the cavity.

43. A cast component comprising: a first section comprising a first metal material and having first grains with a first average grain size; and a second section comprising a second metal material and having second grains with a second average grain size, wherein the first metal material has a different composition than the second metal material, and wherein the first average grain size is greater than the second average grain size.

44. The cast component of any preceding clause, wherein the first grains have an average first aspect ratio that is greater than an average second aspect ratio of the second grains.

45. The cast component of any preceding clause, wherein the first average grain size has an aspect ratio of 2 or greater.

46. The cast component of any preceding clause, wherein the first average grain size has an aspect ratio of 3 or greater.

47. The cast component of any preceding clause, wherein the second average grain size has an aspect ratio of 2 or less.

48. The cast component of any preceding clause, further comprising: a third section having third grains with a third average grain size, wherein the third average grain size is less than the first average grain size, and wherein the third average grain size is greater than the second average grain size.

49. A cast component comprising: a first section comprising a first metal material and having first grains with a first average grain size; and a second section comprising a second metal material in a single crystal, wherein the first metal material has a different composition than the second metal material.

50. The cast component of any preceding claim, wherein the first section defines internal passages therein.

51. A bladed disk comprising: a plurality of airfoils extending radially outward from an internal disk, wherein the plurality of airfoils comprise a first cast metal alloy having a plurality of first grains with a first average grain size, and wherein the internal disk comprises a second cast metal alloy having a plurality of second grains with a second average grain size; and further wherein the first average grain size is greater than the second average grain size.

52. The bladed disk of any preceding clause, wherein the cast metal alloy further has a plurality of third grains with a third average grain size in a transition section between the internal disk and the plurality of airfoils, wherein the third average grain size is larger than the second average grain size.

53. The bladed disk of any preceding clause, wherein the plurality of airfoils define internal cavities therein.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of creating a cast component, the method comprising:
   heating a mold having a cavity therein under controlled conditions such that a first portion of the cavity has a first controlled thermal condition and a second portion of the cavity has a second controlled thermal condition that is different than the first controlled thermal condition;
   thereafter, supplying a first molten metal material into the cavity of the mold such that the first molten metal material is directed to the first portion of the cavity of the mold;
   supplying a second molten metal material into the cavity of the mold such that the second molten metal material is directed to the second portion of the cavity of the mold, wherein the first molten metal material is compositionally different than the second molten metal material; and
   thereafter, allowing the first molten metal material and the second molten metal material to form the cast component by cooling and solidifying the first molten metal material and the second molten metal material;
   wherein the mold is heated such that the first portion has an initial first portion temperature and the second portion has an initial second portion temperature that is different than the initial first portion temperature, and wherein the second portion of the mold is surrounded by an insulating material and wherein the first portion of the mold is not in contact with the insulating material.

2. The method of claim 1, wherein the insulating material is a powder of ceramic material.

3. The method of claim 1, wherein the first portion of the mold is exposed.

4. The method of claim 1, wherein the first molten metal material is an alloy or a superalloy, and wherein the second molten metal material is an alloy or a superalloy.

5. The method of claim 1, wherein the first molten metal material and the second molten metal material mix together within the mold to form a transition zone within the cast component in a transition area between the first portion and the second portion.

6. The method of claim 1, wherein the mold is rotatable around an axis, and wherein the method further comprises: rotating the mold around the axis while supplying the first molten metal material into the cavity such that the first molten metal material flows radially outwardly within the cavity.

7. The method of claim 1, wherein the initial first portion temperature is greater than the initial second portion temperature.

8. The method of claim 1, wherein the cast component has a first section corresponding to the first portion of the mold and having a first average grain size therein, and wherein the cast component has a second section corresponding to the second portion of the mold and having a second average grain size therein; wherein the first average grain size is greater than the second average grain size.

9. The method of claim 1, wherein the cast component has a first section corresponding to the first portion of the mold and having a first average grain size therein, and wherein the cast component has a second section corresponding to the second portion of the mold and having a second average grain size therein; wherein the first average grain size has a higher average aspect ratio than the second average grain size.

10. The method of claim 9, wherein the first section comprises a single crystal.

11. The method of claim 9, wherein a ceramic core is included within the cavity located in the first section.

12. The method of claim 1, further comprising:
    cooling an outer edge of the first portion of the cavity of the mold.

13. The method of claim 1, wherein the mold is constructed from ceramic material.

14. A method of creating a cast component, the method comprising:
    heating a mold having a cavity therein under controlled conditions such that a first portion of the cavity has a first thermal condition and a second portion of the cavity has a second thermal condition that is different than the first thermal condition;
    supplying a first molten metal material into the cavity of the mold such that the first molten metal material is directed to the first portion of the cavity of the mold;
    supplying a second molten metal material into the cavity of the mold such that the second molten metal material is directed to the second portion of the cavity of the mold; and
    thereafter, allowing the first molten metal material and the second molten metal material to form the cast component comprising a first section comprising a first metal material and having first grains with a first average grain size and a second section comprising a second metal material and having second grains with a second average grain size, wherein the first metal material has a different composition than the second metal material, and wherein a transition zone is provided between the first section and the second section, the transition zone having third grains with a third average grain size, wherein the third average grain size is less than the first average grain size, and wherein the third average grain size is greater than the second average grain size.

* * * * *